(12) United States Patent
Davies et al.

(10) Patent No.: US 7,958,777 B1
(45) Date of Patent: Jun. 14, 2011

(54) THERMAL MECHANICAL FATIGUE TEST RIG

(75) Inventors: Daniel O. Davies, Palm City, FL (US); Ross H Peterson, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 142 days.

(21) Appl. No.: 12/573,133

(22) Filed: Oct. 4, 2009

Related U.S. Application Data

(60) Provisional application No. 61/103,490, filed on Oct. 7, 2008.

(51) Int. Cl.
*G01M 15/14* (2006.01)
(52) U.S. Cl. .................................................. 73/112.01
(58) Field of Classification Search ............... 73/112.01, 73/865.6, 866
See application file for complete search history.

(56) References Cited

U.S. PATENT DOCUMENTS

| | | | | |
|---|---|---|---|---|
| 4,854,727 A * | 8/1989 | Pecot et al. | ...................... | 374/57 |
| 5,707,147 A * | 1/1998 | Kurkowski et al. | ................ | 374/1 |
| 6,739,184 B2 * | 5/2004 | Brazeau et al. | ............. | 73/116.02 |
| 6,923,051 B2 * | 8/2005 | Fleming | .......................... | 73/147 |
| 7,174,797 B2 * | 2/2007 | Brostmeyer et al. | ......... | 73/865.6 |
| 7,360,437 B2 * | 4/2008 | Hardwicke et al. | .............. | 73/763 |
| 7,574,904 B1 * | 8/2009 | Davies et al. | ............... | 73/112.01 |
| 7,597,016 B2 * | 10/2009 | Timmons et al. | ............. | 73/865.6 |
| 7,618,825 B2 * | 11/2009 | Balbach | ......................... | 436/155 |
| 2004/0216535 A1 * | 11/2004 | Brostmeyer et al. | ......... | 73/865.6 |

* cited by examiner

*Primary Examiner* — Freddie Kirkland, III
(74) *Attorney, Agent, or Firm* — John Ryznic

(57) ABSTRACT

A thermal mechanical fatigue test rig for testing a coating, such as a thermal barrier coating, under high temperature and pressure to simulate the actual operating environment of the coating. The test rig includes a combustor to produce a hot gas flow, a hollow test specimen on which the coating is placed, and a sapphire vessel that encloses the hollow test specimen to form a hot gas flow path over the coating. The sapphire vessel is clear so that the coating can be observed by a camera during the testing. An exhaust plenum is formed around the sapphire vessel to collect the exhaust form the hot gas flow in which additional cooling air and water for quenching can be injected to reduce the temperature of the hot gas flow prior to discharge from the test rig.

20 Claims, 6 Drawing Sheets

THERMAL MECHANICAL FATIGUE TEST RIG

CROSS-REFERENCE TO RELATED APPLICATIONS

This application claims the benefit to Provisional Application 61/103,490 filed on Oct. 7, 2008 and entitled THERMAL MECHANICAL FATIGUE TEST RIG.

FEDERAL RESEARCH STATEMENT

The US Government has a paid-up license in this invention and the right in limited circumstances to require the patent owner to license others on reasonable terms as provided for by the terms of Contract No. FA8650-08-M-2836 awarded by the USAF/AFMC DET 1 AF RESEARCH LABORATORY.

BACKGROUND OF THE INVENTION

1. Field of the Invention

The present invention relates generally to thermal barrier coatings, and more specifically to a test rig for testing various thermal barrier coatings under operating conditions.

2. Description of the Related Art Including Information Disclosed Under 37 CFR 1.97 and 1.98

Existing known techniques for testing materials to be used in a gas turbine engine are very expensive or do not properly expose the testing material to actual engine operating conditions. One known method is to use an actual gas turbine engine and place the material to be tested on a part in the engine while the engine is operating. This method requires an operating gas turbine engine that is very expensive to operate. An engine test can test a material or a coating for: spallation due to high thermal gradients; erosion due to high velocity flow; corrosion degradation due to trace elements in fuel at operating temperatures and pressures; and, includes the ability to apply axial loading in addition to thermal loading to the test specimen. However, the engine test method is very expensive to operate (about $6,000 per hour to operate), the test conditions are limited to current technologies (pressures, temperatures, stresses) used in the specific testing gas turbine engine, availability of engine hardware, engine test facility, and large staffing requirements, and limited hot time accumulated (generally less than 300 hours).

A less costly method of testing that does not require an operating gas turbine engine is a burner rig. Existing rigs for testing turbine coating/material combinations use a hot flame impingement onto a material/coating specimen to ascertain material/coating durability under hot conditions. While these burner tests are more easily accomplished than full engine tests, are typically of low cost, and are sometimes satisfactory as a screening method, they fail to duplicate many of the parameters leading to material/coating failures observed in actual component designs. Of the conditions described above with respect to the engine test method, a burner rig can provide for a low cost method of testing materials, the burner rig does not allow for the testing for: coating spallation due to high thermal gradients; for erosion to high velocity flow; or for the ability to apply axial loading in addition to thermal loading to the test material.

Realistic engine gas path conditions include high thermal gradients in the test specimen, thermal and mechanical fatigue loading, and erosion due to high velocity gas flow. In real engines, the coating/material components are subjected to cyclical mechanical loading that can affect metal and coating durability and coating adhesion. In addition, the hot gas often contains trace contaminants that can cause corrosion of the metal/coating systems. High velocity gas flows can erode the gas path materials which also reduce their durability. Burner rigs are limited in that no mechanical loading can be applied to the specimen, and that the flow is not at high velocity so that TMF and erosion mechanisms are not duplicated in the test system.

Other complex systems are being developed for advanced testing of gas path materials. The Westinghouse Plasma Corporation's facility in Waltz Mills, Pa. uses a plasma torch to heat material specimens to high thermal loading and also includes mechanical loading capability to simulate TMF conditions. Currently the system is limited to heat flux levels less than 1.2 MBtu/hr/ft.sup.2. The system is also not able to support investigation of erosion failure mechanisms since there is no high velocity flow. Moreover, the ability to accurately measure temperature on the front and backsides of the specimen (to determine thermal gradient) is questionable.

A third system is under development by NASA as part of the Ultra Efficient Engine Technology (UEET) program. This system uses a laser generated heat flux to heat the specimen to high thermal gradients. The current system can achieve approximately 1 MBtu/hr/ft.sup.2. It is unknown if mechanical loading can be applied to the specimen, however, the system is limited in its ability to duplicate erosion failure mechanisms. Further, the system is not pressurized, but does have cooling through the middle of the specimen.

The degradation process that require characterization include coating erosion, spallation, thermal mechanical fatigue, low cycle fatigue, hold-time effects, as well as the interaction of these failure mechanisms. With extremely high cost of developing a new engine concept, especially when operating conditions will exceed all current experience, low cost test rigs are the prudent way to screen new concepts and materials prior to committing to actual engine hardware and full engine testing.

U.S. Pat. No. 7,174,797 issued to Brostmeyer et al on Feb. 13, 2007 and entitled HIGH TEMPERATURE AND PRESSURE TESTING FACILITY discloses a test facility for testing materials under high temperature, pressure, and mechanical loads. The facility provides a physically scaled system that simulates conditions in hot sections of gas turbine engines. A test article is coated with a test material and exposed to a hot combusting flow in a test section housing. The article may be a pipe or conduit member oriented at any direction to the flow. A second cooler flow of fluid is channeled through the test article to create a sharp temperature gradient in the test article and through the test material. A liquid-cooled sleeve is disposed about the test article to create an annular channel of combusting flow over the test article. The downstream end of the second cooler flow is connected to the upstream end of the main hot flow at the combustion chamber. The Brostmeyer et al test rig does not offer the capability to view the material being tested during the testing process. Also, this test rig does not offer easy access to the test material without having to disassemble the test rig.

There is a need in the prior art for a test rig that can provide a low cost way to test materials for use in gas turbine engines, as well as a test rig that can reproduce all the conditions such as high temperature, high pressure, erosion, corrosion, and thermal and mechanical loading, that occur in an operating gas turbine engine.

It is an object of the present invention to provide for an apparatus and a method that can test materials at a very low cost.

It is another object of the present invention to provide for an apparatus and a method to test materials under the extreme conditions operating in a gas turbine engine.

It is another object of the present invention to provide for an apparatus and a method that can test materials at temperatures above the maximum temperature permitted by today's material limitations.

It is another object of the present invention to provide for an apparatus and a method that can test materials under axial and thermal loadings.

It is another object of the present invention to provide for an apparatus and a method to test materials under the extreme conditions operating in a gas turbine engine in which the material being tested can be visually observed during the testing.

It is another object of the present invention to provide for an apparatus and a method to test materials under the extreme conditions operating in a gas turbine engine in which the exhaust gas flow from the test rig has been cooled enough to prevent thermal damage to valves and conduits downstream from the test rig.

It is another object of the present invention to provide for an apparatus and a method to test materials under the extreme conditions operating in a gas turbine engine in which the hot gas flow passing over the material to be tested is clear so that the material being tested can be seen.

BRIEF SUMMARY OF THE INVENTION

The test rig is used to test a material such as a TBC under real conditions as would appear in a gas turbine engine. The test rig includes a test specimen tube with a coating applied on an outer surface in which cooling air flows through the inner surface. A sapphire vessel forms a hot gas flow path with the test specimen tube to channel a hot gas flow from a combustor in which the cooling air is delivered and burned with a fuel to produce the hot gas flow for testing. The sapphire vessel is clear so that the material can be observed visually during the testing. The sapphire vessel is surrounded by an annular exhaust plenum in which the hot gas flow is passed into through a hole formed on an end of the sapphire vessel. Cooling air flows around the annular exhaust plenum to provide cooling and then flows into the exhaust plenum to be mixed with the hot gas flow to lower the temperature.

A sapphire window is formed on the test rig casing and looks down into the annular exhaust plenum so that the material can be visually observed. The hot gas flow from the exhaust plenum is discharged through an exhaust tube that includes water injectors to inject water into the cooled hot gas flow to quench the hot gas flow and further cool it so that the exhaust will not damage valves or conduits located downstream from the test rig. The combustor burns natural gas to produce the hot gas flow, and the combustor operates at lean burning so that all of the fuel will be burned and the hot gas flow resulting will be clear such that the annular exhaust plenum is clear for viewing of the material.

BRIEF DESCRIPTION OF THE SEVERAL VIEWS OF THE DRAWINGS

FIG. 3b shows a front view of the sapphire vessel; of FIG. 3a.

DETAILED DESCRIPTION OF THE INVENTION

Figure 1:
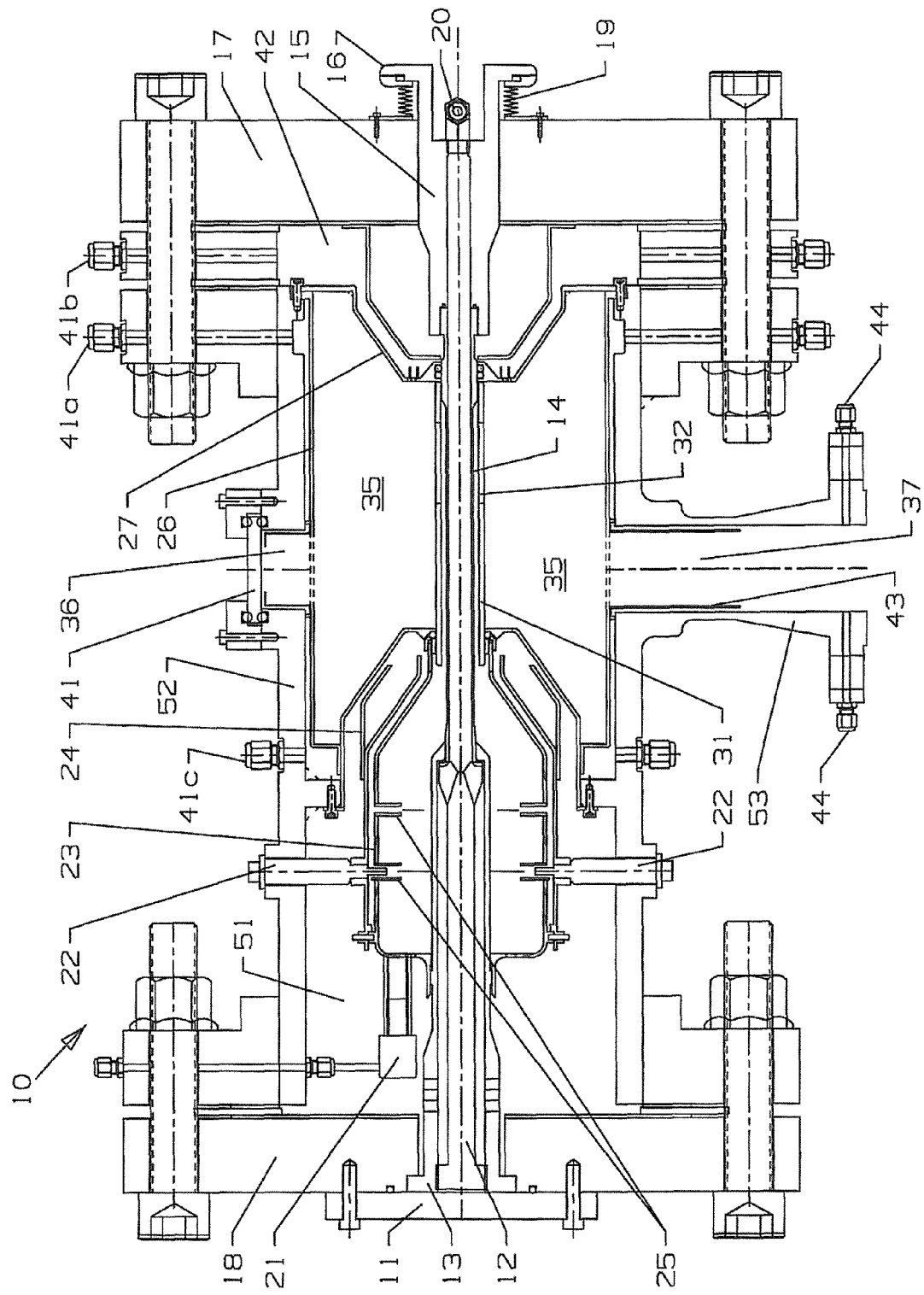
FIG. 1 shows a cross sectional view of the test rig of the present invention.

The thermal mechanical fatigue (TMF) test rig 10 of the present invention is shown in FIG. 1. The test rig is used for testing one or more coatings at a time under the operating conditions (high temperature, high pressure) simulating the conditions in a turbine of a gas turbine engine in which the coating would be exposed to but at significant lower cost. The test rig 10 includes a specimen port 11 for easy access to the test rig. A centering rod 12 having a bolt head on the outside end and a three pronged end on the inner end fits within a forward specimen grip 13 that has a hollow inner portion and a narrow opened portion on the inner end. A test specimen tube 14 is mounted within the test rig 10 and includes one end with a radial outward extending flange that is secured between a narrow opened portion of the forward specimen grip 13 and the three prongs of the centering rod 12. The test specimen tube 14 is a hollow tube with an outer surface on which the material to be tested is mounted and an inner surface that forms a flow path for cooling air. The outer end of the test specimen tube 14 is secured into a hole formed within a rear specimen grip 15. The rear specimen grip 15 includes a radial flange 16 that forms an abutment surface on the inside for a bellows seal 19 that is secured to a rear housing 17 opposite to a forward housing 18. An air inlet port 20 is formed in the rear specimen grip 15 to supply cooling air to the combustor and the inner surface of the hollow test specimen tube 14.

An igniter 21 is located in the forward end of the test rig and is used to ignite the fuel within the combustor 23. A plurality of fuel injectors 22 is arranged around the combustor 23 in a radial inward direction to inject fuel circumferentially around the combustor 23. The combustor 23 is a high swirl combustor in order to produce a longer burn zone and to produce a full combustion of the fuel. A combustor outer liner 24 is formed around the combustor 23 to form a cooling air supply passage for the air that is eventually supplied to the combustor. The combustor 23 includes air supply holes 25 spaced around to allow for the cooling air to flow into the combustor.

Figure 3B:
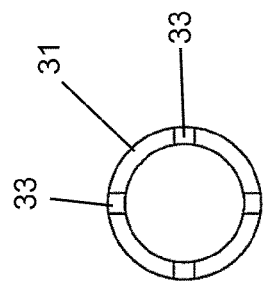
Figure 2:
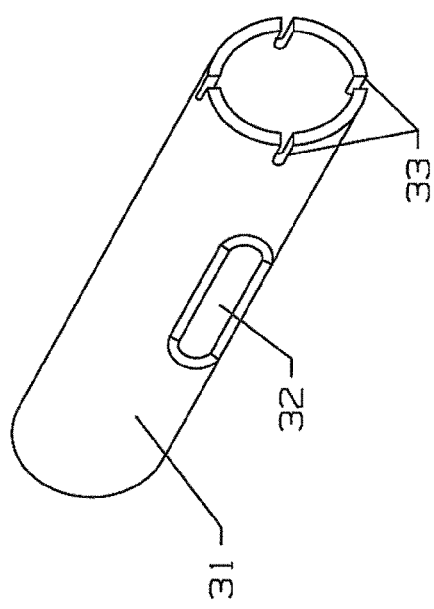
FIG. 2 shows an isometric view of the sapphire vessel used in the test rig of FIG. 1.
Figure 3A:
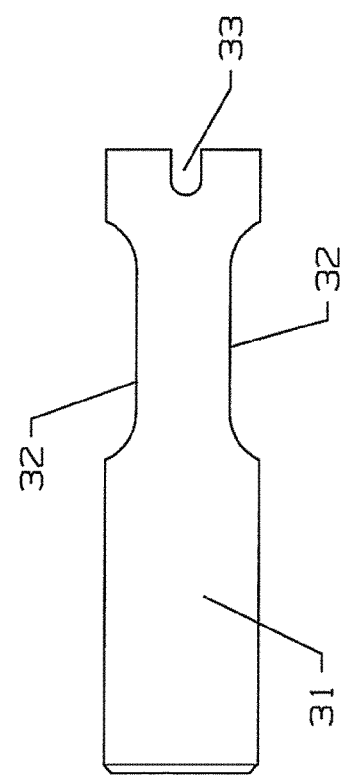
FIG. 3a shows a cross section view of the sapphire vessel of FIG. 2.

An annular shaped exhaust plenum 35 is formed by an outer cooling liner 26 secured to an inner cooling liner 27 with a sapphire vessel 31 on the inner side to enclose the exhaust plenum 35. The sapphire vessel 31 forms a hot gas flow path with the outer surface of the hollow test specimen tube 14. The purpose of the sapphire vessel 31 is to withstand the extremely high temperatures of the hot gas flow while allowing for the test material to be viewed from the outside the test rig 10. Sapphire offers both this type of high temperature resistance and visibility. FIGS. 2 and 3 shows the sapphire vessel 31 in more detail which includes an aft end with four slots 33 spaced around the end and two opening 32 on opposite sides to discharge the hot gas flow passing through the inner portion of the vessel and exhaust into the exhaust plenum 35. The slots 33 fit within outwardly extending fingers formed on the test specimen tube 14. FIG. 3a shows a cross section side view of the sapphire vessel 31 which is made of a very high temperature resistant clear material that can withstand the high temperature combustion gas and allow for the coating on the test specimen tube 14 to be seen visually. FIG. 3b shows a front view of the sapphire vessel 31 of FIG. 3a. The sapphire vessel 31 and the test specimen tube 14 form a closed path between them so that the hot gas flow from the combustor 23 will flow through the openings 32 and into the exhaust plenum 35. The main function of the annular shaped exhaust plenum 35 with the cooling air injection is not to cool the plenum but to cool the hot gas flow from the combustor 23 prior to it being discharged from the test rig 10. Without a cool down, the hot gas flow passing over the coating will be exhausted from the test rig at far too high a temperature.

The test rig casing includes an opening 36 covered with a sapphire window 41 that allows for the coating on the test specimen tube 14 to be viewed from outside the test rig 10. The sapphire window 41 is secured in the opening 36 by an annular ring bolted to the casing as seen in FIG. 1.

The annular shaped exhaust plenum 35 is enclosed within the casing 52 and the aft end piece 17 to form cooling air flow paths between the casing 52 and the outer surface of the exhaust plenum 35. Cooling air supply ports 41a and 41b allow for pressurized cooling air to flow through passages in the casing 52 and into a space 42 on the aft end of the exhaust plenum 35 and in the space formed between the outer surface of the outer cooling liner 26 and the inner surface of the housing or casing 52. The aft end of the inner cooling liner 27 includes holes (arrows in FIG. 4) to allow for the cooling air to flow from the space 42 and into the exhaust plenum 35. Air supply port 41a supplies cooling air to the aft space between the outer cooling liner 26 and the casing 52, air supply port 41b supplies cooling air to the space 42, and air supply port 41c supplies cooling air to the forward space between the outer cooling liner 26 and the casing 52. The cooling air supply ports 41a-c each are annularly spaced around the casing to inject the cooling air into the space in an annular manner to cool the annular exhaust plenum.

An exhaust port 53 is formed on the casing 52 to discharge the hot gas from the exhaust plenum 35 after the hot exhaust gas from the combustor has been diluted with cooling air. An exhaust tube 43 is secured to the outer cooling liner 26 to direct the exhaust into the exhaust port 53 and to form a cooling air flow path between the inner surface of the exhaust port 53 and the outer surface of the exhaust tube 43. Cooling air flowing over the outer cooling liner 26 will eventually flow around the exhaust tube 43 and then into the exhaust port 53 to be merged with the hot gas exhaust from the exhaust plenum 35.

Figure 4:
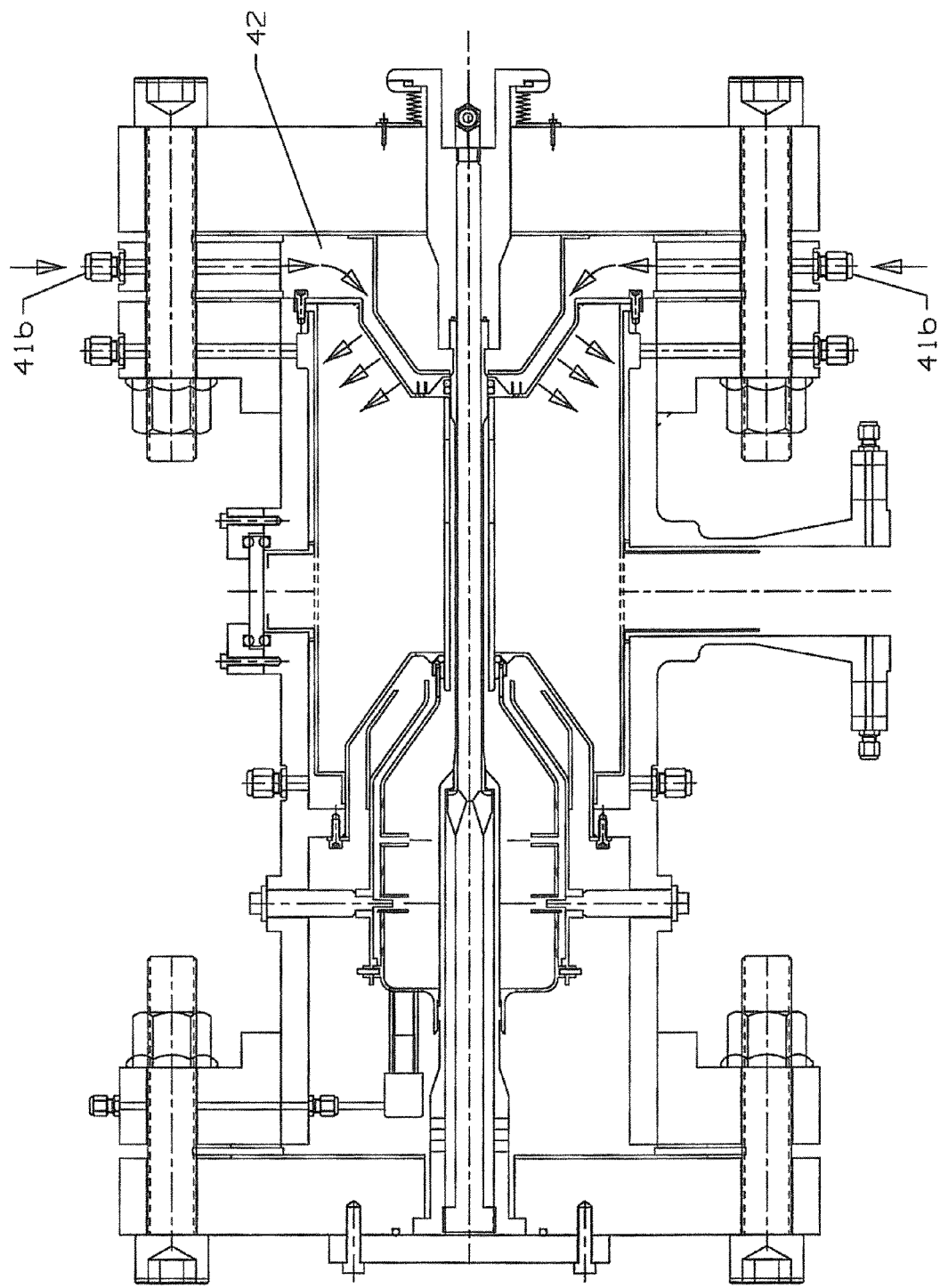
FIG. 4 shows a cross sectional view of the test rig of the present invention with the flow of cooling air into the rear end of the exhaust plenum.

The operation of the test rig is described below. A coating material to be tested under high pressure and temperature conditions is applied to the outer surface of the test specimen tube 14 in an area that can be viewed through the clear sapphire vessel 31. The coating could be a TBC that will be used on a turbine blade or vane in the turbine section of a gas turbine engine. FIG. 4 shows the path that the cooling air supplied to port 41b will take. The cooling air flows through the passage in the casing and into the space 42 and then into the holes formed in the back of aft end of the inner cooling liner 27 (as seen by the arrows) and into the exhaust plenum 35. A number of cooling air ports 41b are annularly spaced around the casing so that enough cooling air flows around the inner cooling liner 27.

Figure 5:
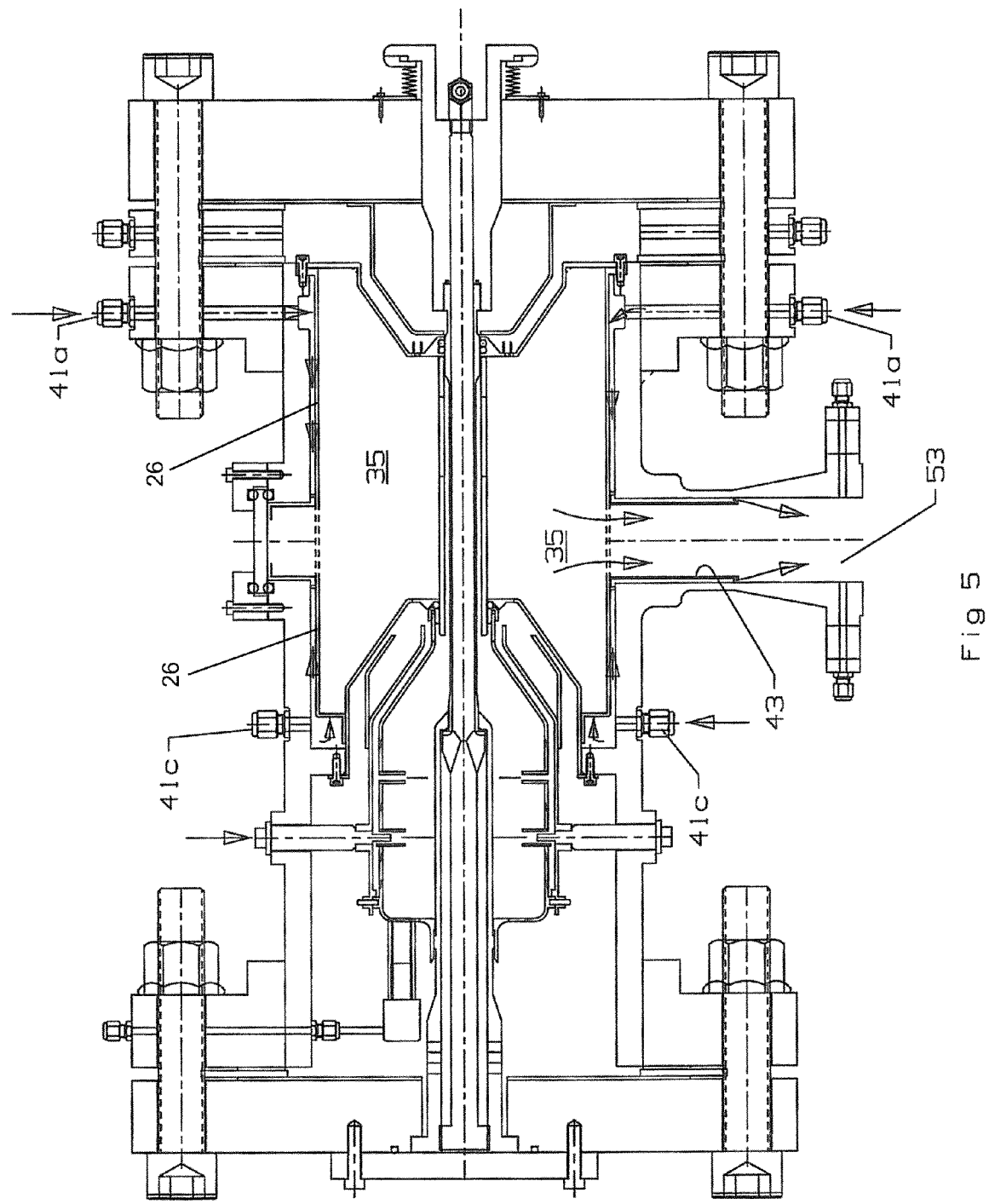
FIG. 5 shows a cross sectional view of the test rig of the present invention with the flow of cooling air into the forward end of the exhaust plenum and into the exhaust tube and exhaust port.

FIG. 5 shows the cooling air supplied to ports 41c and 41a where the ports are spaced around the casing to form an annular array of cooling air injection ports just like ports 41b. The cooling air from ports 41 and 41c flow around and over the outer cooling liner 26 and then between the space formed between the exhaust port 53 and the exhaust tube 43 (see the arrows in FIG. 5) to join the hot gas flow from the exhaust plenum 35 and flow out from the exhaust port 53.

Figure 6:
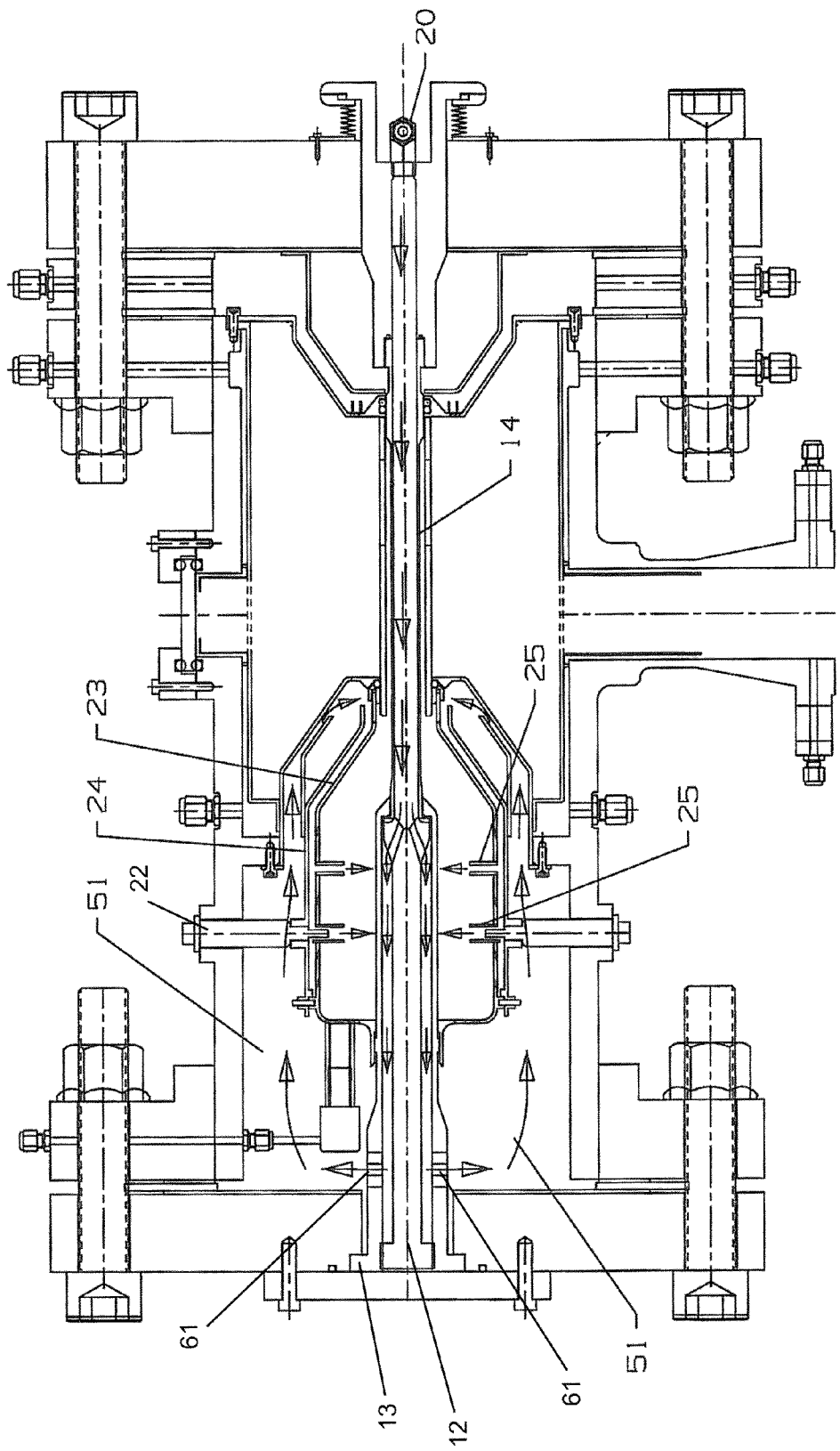
FIG. 6 shows a cross sectional view of the test rig of the present invention with the flow of cooling air through the test specimen tube and then into the combustor.

FIG. 6 shows the cooling air flow through the test specimen tube 14 that eventually enters the combustion chamber to be burned with the fuel to produce the hot gas flow used in the testing rig. The cooling air enters through the cooling air inlet port 20 and flows through the hollow test specimen tube 14 from the rear or aft end, enters the space formed between the outer surface of the centering rod 12 and the inner surface of the forward specimen grip 13, flows through radial ports 61 in the forward specimen grip 13 and into the space 51, over the combustor outer liner 24 toward the aft end, through a space formed between the combustor 23 and the combustor liner 24 in an opposite direction, and then through two rows of annular openings 25 and into the combustor 23 to be burned with the fuel from the injectors 22. This flow provides cooling for the combustor prior to being burned with the fuel in the combustor. The cooling air also provides cooling for the hollow test specimen tube 14 which is exposed to the hot gas flow from the combustor 23.

Figure 7:
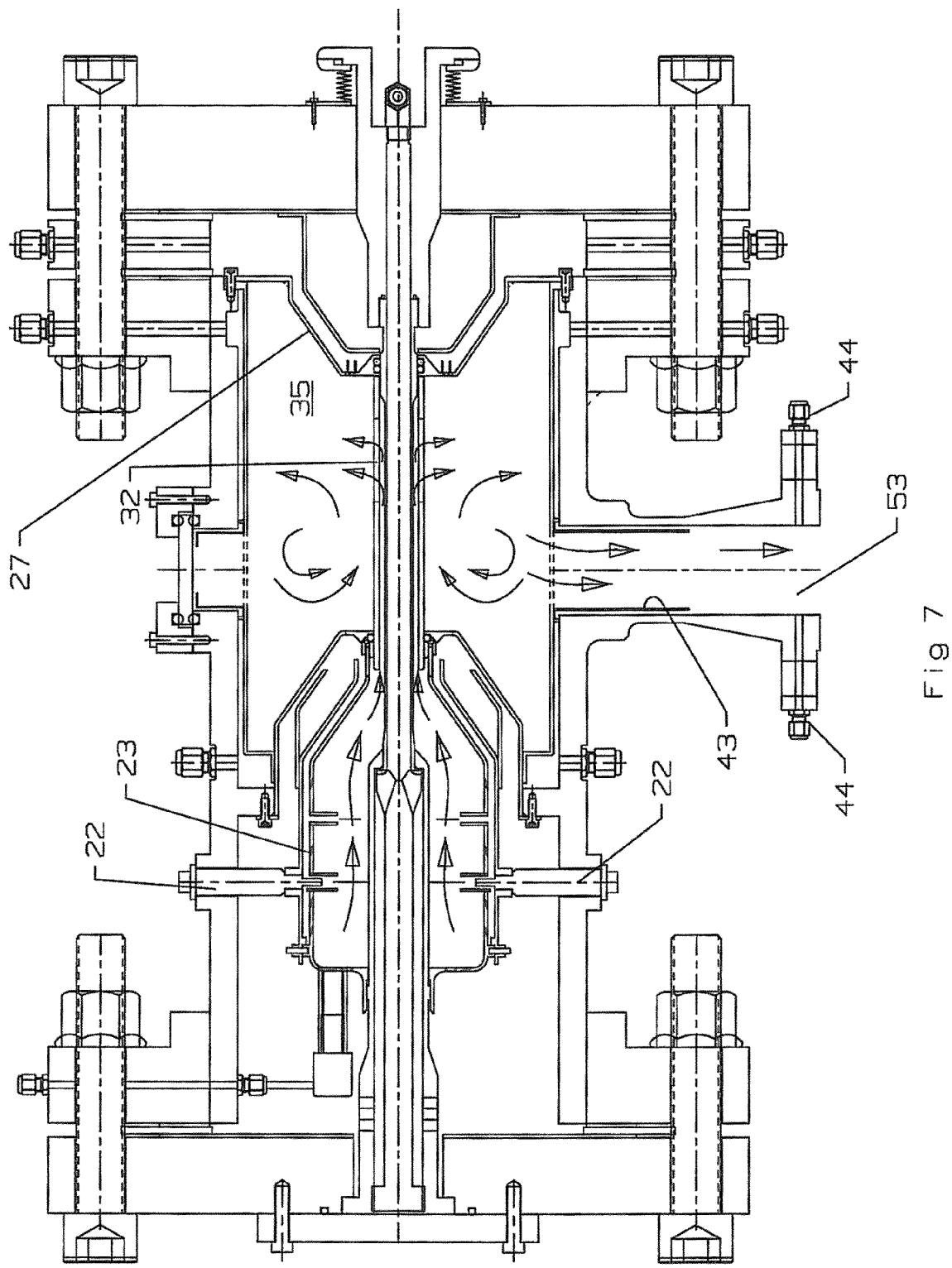
FIG. 7 shows a cross sectional view of the test rig of the present invention with the flow of hot gas from the combustor, over the coating on the test specimen tube and then into the exhaust plenum and out the exhaust port.

FIG. 7 shows the flow of the hot gas that is produced in the combustor 23 with the fuel injected by the injectors 22. The hot gas flows from the combustor 23 and through a passage formed between the sapphire vessel 31 and the hollow test specimen tube 14 and over the coating or coatings that are to be tested. The hot gas then flows through the two openings 32 formed near the aft end of the sapphire vessel 31 and into the exhaust plenum 35, where the hot gas flow is merged with the cooling air that flows through the holes in the aft end of the inner cooling liner 27. This reduces the overall temperature of the hot gas flow prior to e discharged from the test rig 10. The mixture of hot gas flow and cooling air then flows out through the exhaust tube 43, where the other cooling air is merged with the hot gas exhaust and flows into the exhaust port 53. Quench water injection ports 44 spaced around the outlet of the exhaust port 53 injects water into the cooled hot gas flow to further cool the gas to a low enough temperature to prevent thermal damage to the valves and conduits downstream (in the hot gas flow path) from the test rig.

On the rear or aft end of the rear specimen grip 15 and connected to the radial flange 16, a double acting hydraulic cylinder can be connected in order to apply a load to the hollow test specimen tube 14 in order to test the coating under high pressure and temperature while a tensile load is being applied to the coating.

Because the sapphire vessel 31 and the sapphire window 41 are both clear see-through materials that can be exposed to these high temperatures, the coating can be observed during testing with a camera or other video equipment. The fuel used in the combustor is natural gas and is burned lean with extra cooling air so that most of the natural gas is combusted. This leaves a clean exhaust that enters the exhaust plenum 35, and when combined with the cooling air, does not block the view of the coating on the outer surface of the test specimen tube 14.

We claim the following:

1. A test rig for testing a material under conditions of a turbine in a gas turbine engine, the test rig comprising:
    a hollow test tube specimen having an inner surface forming a cooling air flow path and an outer surface for placing a material to be tested;
    a sapphire vessel forming a hot gas flow path with the hollow test tube specimen, the sapphire vessel being clear so that the material being tested can be visually observed from outside of the sapphire vessel;
    an annular exhaust plenum formed around the sapphire vessel and being connected to the hot gas flow path through a window in the sapphire vessel;
    a combustor connected to the hollow test tube specimen and to the sapphire vessel so that cooling air passing through the hollow test tube specimen will flow into the combustor to be burned with a fuel to produce a hot gas flow that flows through the hot gas flow path formed between the hollow test tube specimen and the sapphire vessel;
    an exhaust tube connected to the annular exhaust plenum to discharge the hot gas flow from the exhaust plenum; and,
    cooling air inlet holes spaced around the annular exhaust plenum to inject cooling air into the exhaust plenum to be mixed with the hot gas flow to cool down the hot gas flow prior to flowing through the exhaust tube.

2. The test rig of claim 1, and further comprising:
    a water injector located downstream from the exhaust tube to inject water into the cooled hot gas flow to quench the cooled hot gas flow and further cool down the hot gas flow such that thermal damage to valves and conduits located downstream from the test rig will not occur.

3. The test rig of claim 1, and further comprising:
    the annular exhaust plenum includes an inner cooling liner on an aft end of the exhaust plenum and forming a space with a test rig housing for cooling air; and,
    the inner cooling liner including the cooling air inlet holes to inject cooling air into the exhaust plenum.

4. The test rig of claim 1, and further comprising:
    the annular exhaust plenum forming a cooling air space with a casing of the test rig for cooling air to flow;
    a forward cooling air port to inject cooling air into a forward side of the cooling air space; and,
    an aft cooling air port to inject cooling air into an aft side of the cooling air space;
    wherein cooling air from the forward and aft ports will flow around the annular exhaust plenum to provide convection cooling.

5. The test rig of claim 4, and further comprising:
    the exhaust tube is located within an exhaust port and forms a cooling air exhaust passage for the cooling air from the forward and aft ports; and,
    the exhaust tube ending within the exhaust tube so that the cooled hot gas flow from the exhaust plenum will mix with the cooling air from the forward and aft ports to further cool down the hot gas flow.

6. The test rig of claim 5, and further comprising:
    a water injector located in an end of the exhaust port and downstream from the exhaust tube to inject water into the cooled hot gas flow to quench the cooled hot gas flow and further cool down the hot gas flow such that thermal damage to valves and conduits located downstream from the test rig will not occur.

7. The test rig of claim 1, and further comprising:
    the annular exhaust plenum includes an opening for visually observing the test material from outside the test rig; and,
    a sapphire window closing the opening so that the hot gas flow will not flow out the exhaust plenum opening.

8. The test rig of claim 7, and further comprising:
    the annular exhaust plenum includes a radial extending port with an opening; and,
    the sapphire window is secured within the test rig casing so that the sapphire window closes the radial extending port opening.

9. The test rig of claim 1, and further comprising:
    the combustor is an annular combustor with radial air supply holes;
    an annular combustor outer liner formed around the annular combustor to form a cooling air space that connects to the radial air supply holes;
    means to connect the inner surface of the hollow test tube specimen with the cooling air space so that the cooling air from the hollow test tube specimen will flow into the combustor.

10. The test rig of claim 9, and further comprising:
    the means to connect the inner surface of the hollow test tube specimen with the cooling air space delivers the cooling air from the hollow test tube specimen at an aft end of the cooling air space formed between the combustor and the combustor liner.

11. The test rig of claim 9, and further comprising:
    the means to connect the inner surface of the hollow test tube specimen with the cooling air space includes a centering rod that supports the hollow specimen tube on an aft end of the centering rod;
    a specimen port that supports the centering rod and supports the combustor and forms a cooling air space with the centering rod; and,
    a forward end of the specimen port includes a plurality of radial ports to pass the cooling air from the cooling air space formed between the centering rod and the specimen port to the combustor.

12. A process for testing a material under high temperature and pressure simulating a condition in a gas turbine engine, the process comprising the steps of:
    passing a cooling air flow into a combustor;
    burning the cooling air flow with a fuel to produce a hot gas flow;
    passing the hot gas flow over a material to be tested;
    after passing the hot gas flow over the material to be tested, passing the hot gas flow into an exhaust plenum;
    injecting additional cooling air flow into the exhaust plenum to cool down the hot gas flow; and,
    discharging the cooled hot gas flow from the exhaust plenum.

13. The process for testing a material of claim 12, and further comprising the step of:
    cooling the material to be tested with the cooling air prior to mixing the cooling air with the fuel to produce the hot gas flow.

14. The process for testing a material of claim 12, and further comprising the step of:
    after discharging the cooled hot gas flow from the exhaust plenum, mixing the cooled hot gas flow with water to further cool the hot gas flow.

15. The process for testing a material of claim 13, and further comprising the step of:
    after cooling the material to be tested and prior to burning the cooling air in the combustor, cooling the combustor with the cooling air.

16. The process for testing a material of claim 12, and further comprising the steps of:
  cooling an outer surface of the exhaust plenum with cooling air; and,
  mixing the cooling air from the outer exhaust plenum surface with the cooled hot gas flow being discharged from the exhaust plenum.

17. The process for testing a material of claim 16, and further comprising the step of:
  after mixing the cooling air from the outer exhaust plenum surface with the cooled hot gas flow being discharged from the exhaust plenum, mixing the cooled hot gas flow with water to further cool the hot gas flow.

18. The process for testing a material of claim 12, and further comprising the step of:
  burning natural gas in a lean ratio with air to produce a clear hot gas flow so that the material to be tested can be visually observed.

19. The process for testing a material of claim 18, and further comprising the step of:
  passing the clear hot gas flow into the exhaust plenum; and,
  visually observing the material to be tested through the clear hot gas flow in the exhaust plenum.

20. The process for testing a material of claim 12, and further comprising the step of:
  visually observing the material to be tested through a sapphire window surrounding the material.

\* \* \* \* \*